United States Patent
Stein

(10) Patent No.: US 10,827,151 B2
(45) Date of Patent: Nov. 3, 2020

(54) REAR OBSTRUCTION DETECTION

(71) Applicant: MOBILEYE VISION TECHNOLOGIES LTD., Jerusalem (IL)

(72) Inventor: Gideon Stein, Jerusalem (IL)

(73) Assignee: MOBILEYE VISION TECHNOLOGIES LTD., Jerusalem (IL)

(*) Notice: Subject to any disclaimer, the term of this patent is extended or adjusted under 35 U.S.C. 154(b) by 0 days.

(21) Appl. No.: 16/524,875

(22) Filed: Jul. 29, 2019

(65) Prior Publication Data

US 2019/0356886 A1    Nov. 21, 2019

Related U.S. Application Data

(63) Continuation of application No. 15/805,128, filed on Nov. 6, 2017, now Pat. No. 10,389,985, which is a
(Continued)

(51) Int. Cl.
*H04N 7/18* (2006.01)
*G06K 9/00* (2006.01)

(52) U.S. Cl.
CPC ......... *H04N 7/183* (2013.01); *G06K 9/00805* (2013.01); *B60R 2300/30* (2013.01);
(Continued)

(58) Field of Classification Search
CPC ............ G06K 9/00805; B60R 2300/30; B60R 2300/404; B60R 2300/806; B60R 2300/8093
(Continued)

(56) References Cited

U.S. PATENT DOCUMENTS 6,437,688 B1   8/2002   Kobayashi
9,002,511 B1   4/2015   Hickerson et al.
(Continued)

FOREIGN PATENT DOCUMENTS

DE   19842827 A1   3/2000
DE   10242087 A1   3/2004
(Continued)

OTHER PUBLICATIONS

Communication about intention to grant a European Patent received from the European Patent Office in EP Application No. 08769247.1, dated May 22, 2013.
(Continued)

*Primary Examiner* — Hee-Yong Kim
(74) *Attorney, Agent, or Firm* — Finnegan, Henderson, Farabow, Garrett & Dunner, LLP

(57) ABSTRACT

A method is provided using a system mounted in a vehicle. The system includes a rear-viewing camera and a processor attached to the rear-viewing camera. When the driver shifts the vehicle into reverse gear, and while the vehicle is still stationary, image frames from the immediate vicinity behind the vehicle are captured. The immediate vicinity behind the vehicle is in a field of view of the rear-viewing camera. The image frames are processed and thereby the object is detected which if present in the immediate vicinity behind the vehicle would obstruct the motion of the vehicle. The processing is preferably performed in parallel for a plurality of classes of obstructing objects using a single image frame of the image frames.

11 Claims, 8 Drawing Sheets

Related U.S. Application Data continuation of application No. 12/112,172, filed on Apr. 30, 2008, now Pat. No. 9,826,200.

(60) Provisional application No. 60/914,859, filed on Apr. 30, 2007.

(52) U.S. Cl.
CPC ... *B60R 2300/404* (2013.01); *B60R 2300/806* (2013.01); *B60R 2300/8093* (2013.01)

(58) Field of Classification Search
USPC .......................................................... 348/148
See application file for complete search history.

(56) References Cited

U.S. PATENT DOCUMENTS

| | | | |
|---|---|---|---|
| 2002/0044691 | A1 | 4/2002 | Matsugu |
| 2002/0084675 | A1 | 7/2002 | Buchanan, Jr. et al. |
| 2003/0079929 | A1 | 5/2003 | Takagi et al. |
| 2003/0165255 | A1 | 9/2003 | Yanagawa et al. |
| 2004/0016870 | A1 | 1/2004 | Pawlicki et al. |
| 2004/0234136 | A1 | 11/2004 | Zhu et al. |
| 2005/0025357 | A1 | 2/2005 | Landwehr et al. |
| 2005/0075770 | A1 | 4/2005 | Taylor et al. |
| 2005/0143887 | A1 | 6/2005 | Kinoshita |
| 2005/0249401 | A1 | 11/2005 | Bahlmann et al. |
| 2005/0272502 | A1* | 12/2005 | Marks ................ A63F 13/42 463/36 |
| 2006/0080005 | A1 | 4/2006 | Lee et al. |
| 2006/0125919 | A1 | 6/2006 | Camilleri et al. |
| 2006/0176370 | A1 | 8/2006 | Chen et al. |
| 2006/0208169 | A1 | 9/2006 | Breed et al. |
| 2006/0248029 | A1 | 11/2006 | Liu et al. |
| 2006/0287825 | A1 | 12/2006 | Shimizu et al. |
| 2007/0110309 | A1 | 5/2007 | Ibrahim et al. |
| 2007/0146165 | A1 | 6/2007 | Tanaka |
| 2007/0147664 | A1 | 6/2007 | Kubota et al. |
| 2007/0154068 | A1 | 7/2007 | Stein et al. |
| 2008/0224837 | A1 | 9/2008 | Meyer et al. |
| 2008/0297360 | A1 | 12/2008 | Knox et al. |
| 2009/0016636 | A1* | 1/2009 | Kasashima ............ H04N 5/272 382/274 |

FOREIGN PATENT DOCUMENTS

| | | |
|---|---|---|
| DE | 102006023611 A1 | 11/2007 |
| EP | 1 094 337 A2 | 4/2001 |
| EP | 1 790 541 A2 | 5/2007 |
| EP | 1 876 829 A1 | 1/2008 |
| JP | 2006199161 A | 8/2006 |
| KR | 2003 0010891 A | 2/2003 |
| WO | WO 0015462 A1 | 3/2000 |
| WO | WO 2004086301 A2 | 10/2004 |
| WO | WO 2004114202 A1 | 12/2004 |

OTHER PUBLICATIONS

Durucan et al., "Change Detection and Background Extraction by Linear Algebra" Proceedings of the IEEE, Oct. 2001, pp. 1369-1381, vol. 89, Issue 10.
European Patent Office, Communication from European Patent Office of notices of opposition, dated Apr. 22, 2015.
European Patent Office, Examination Report, dated Jun. 21, 2011.
European Patent Office, Extended European Search Report issued in EP13174402.1, dated Nov. 18, 2013, Germany.
European Patent Office, Extended European Search Report issued in EP13174489.8, dated Nov. 19, 2013, Germany.
European Patent Office, Notice of Opposition, dated Mar. 25, 2015, Germany.
European Patent Office, Opposition communication from European Patent Office, dated Mar. 16, 2015, European Patent No. EP 2 150 437, filed pursuant to Art. 99 para. 1 EPC to the abovementioned European Patent EP 2 150 437 (hereinafter referred to as the "contested patent") by Conti Ternic microelectronic GmbH, Sieboldstrasse 19, 90411 Nuremberg, DE.
European Patent Office, Supplementary European Search Report, dated May 21, 2010.
Franke et al., "Fast Obstacle detection for Urban Traffic Situations" IEEE Transactions on Intelligent Transportation Systems Sep. 2002, pp. 173-181, vol. 3, Issue 3.
Gavrila, "Pedestrian Detection From a Moving Vehicle," Proceeding of the European Conference on Computer Vision, Dublin, Ireland, 2000.
Opposition Counter Statement, in a communication dated Oct. 21, 2015 to the European Patent Office for EP Patent No. EP215043.
Opposition Letter from Dr. Kristian Jauregui Urbahn, Patent Attorney, CDA-IP department, Llaiernstr 12, sent to the European Patent Office Concerning EP 2 150 437 B1.
PCT, International Search Report of PCT/US 08/62003, dated Aug. 20, 2008.
Text as intended to grant received from the European Patent Office in EP Application No. 08769247.1, dated May 22, 2013.

\* cited by examiner

FIG. 5B With Rearlights
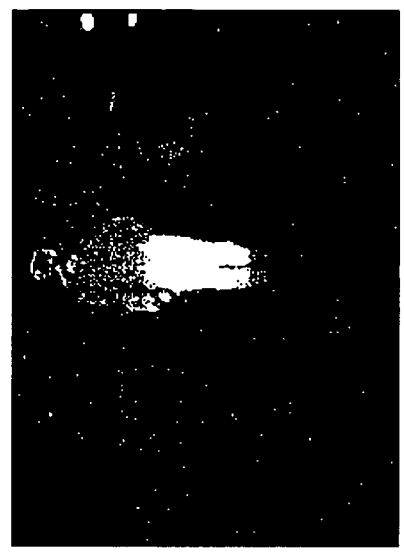
FIG. 5D Thresholded difference image
FIG. 5A No Rearlights
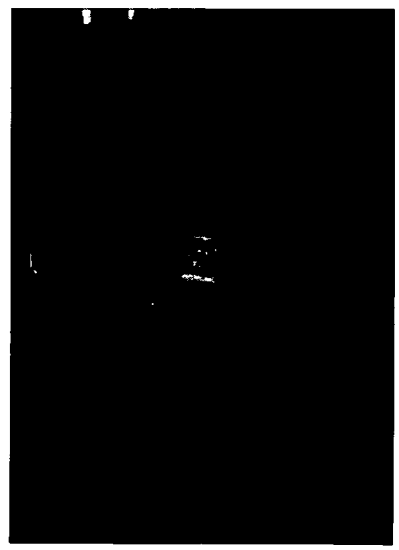
FIG. 5C Difference Image

REAR OBSTRUCTION DETECTION

CROSS REFERENCE TO RELATED APPLICATIONS

The present application is a continuation of U.S. Nonprovisional application Ser. No. 15/805,128, filed Nov. 6, 2017, which is a continuation of U.S. Nonprovisional application Ser. No. 12/112,172, filed Apr. 30, 2008, which claims the benefit of priority of U.S. provisional application No. 60/914,859 filed Apr. 30, 2007. The disclosures of the foregoing applications are incorporated herein by reference in their entireties.

FIELD AND BACKGROUND

The present invention relates to vehicle warning systems, and more particularly to a system and method for detection of objects behind the vehicle and classification of the objects.

Motor vehicles, especially sport utility vehicles (SUV), pick-up trucks and off-road vehicles typically have a "blind" zone behind the vehicles which is a contributing cause for accidents when the vehicles are driven in reverse. The "blind" zone cannot be viewed directly by the driver nor with the use of the vehicle mirrors. Motor vehicle accidents involving vehicles being driven in reverse cause vehicle damage there is a collision with typically low obstructions, e.g. walls and poles, and serious accidents involving children.

In an effort to reduce the frequency and severity of vehicular accidents involving vehicles being driven in reverse, vehicle manufacturers have introduced rear-view cameras mounted on the vehicle which image the "blind" zone behind the vehicle.

U.S. Pat. No. 7,113,867 disclosed by the present inventor system is designed to detect objects in front of the vehicle. A camera is mounted inside a vehicle behind the windshield, and views the environment through the windshield in front of vehicle. A processor analyzes the images acquired by the camera. The system is operative to detect lane markings, pedestrians, other vehicles, obstacles, road signs, and/or other objects up to relatively long distances, typically 50-100 meters from the front of the vehicle.

Recognition of obstacles located behind a vehicle present a different set of image processing issues than addressed by a forward-looking camera system. Obstacles located behind a vehicle may be stationary or slowly moving, and at close range, at one to two meters. An additional factor to be considered is that vehicles move in reverse under 10 km/hour.

Rear looking camera systems which provide the driver additional visibility using an attached monitor, for example parking assist systems, and blind spot detection systems are known in the industry, but unlike the forward looking camera systems, these reverse looking camera systems provide the driver images on the monitor without providing any analysis of the images or warning of the existence of an obstacle behind the vehicle or of an expected collision with an obstacle.

There is thus a need for, and it would be highly advantageous to have a rear viewing camera system mounted in a vehicle which provides analysis for particularly common classes of obstacles typically found behind a vehicle and warnings to the driver based on the analysis when such obstacles are found.

European Patent EP1876829 discloses a vehicle vicinity monitoring system which captures images of the vicinity of the vehicle using an image-capturing device, and uses a notification device to provide vehicle occupants with information concerning obstacles in the vicinity of the vehicle. A primary lighting device and/or a secondary lighting device are provided to the vehicle. The primary lighting device directs light upon shadows cast within the imaging field of the image-capturing device as a result of the illumination device being illuminated. The secondary lighting device is a lighting device for projecting light in a prescribed pattern within the imaging field of the image-capturing device in order to confirm the existence of an obstacle.

BRIEF SUMMARY

The term "immediate vicinity" in reference to a vehicle typically includes the ground less than one meter from the vehicle edge in the direction of intended motion, e.g reverse motion, or in other embodiments (e.g. for cameras of field of view 180 degrees or more) the term "immediate vicinity" induces zero distance from the vehicle edge in the direction of intended motion in which the camera also views straight down.

According to an aspect of the present invention, there is provided a system mounted in a vehicle. A camera is oriented to capture image frames from the immediate vicinity of the vehicle in a direction of motion, e.g. reverse motion, of the vehicle. The immediate vicinity of the vehicle including the ground at least one meter from the end of the vehicle in the direction of the motion is in a field of view of the camera. A processor attached to the camera inputs the image frames. The processor processes the image frames for detection in the immediate vicinity of the vehicle of an object which if present obstructs the motion of the vehicle. A warning mechanism attached to the processor preferably warns the driver of the vehicle when the object is detected. The detection is typically performed for multiple classes of obstructing objects using a single image frame while the vehicle is stationary. The classes of obstructing objects include spherical balls, vertical poles, hanging chains and upright boxes. Alternatively or in addition, the detection uses color in a single image frame when the color is distinguishable from background colors in the vicinity of the vehicle. The detection is preferably performed by performing image differencing between the image frames while the vehicle is stationary and while the object is moving. Typically, a light is attached to the vehicle which illuminates the immediate vicinity and the detection is performed using the image frames by imaging the illumination from the light. When the object is a wall in the immediate vicinity of the vehicle, a light is attached to the vehicle, illuminating the wall. The detection includes estimating a distance between the vehicle and the wall based on the position in image space of the illumination from the light. The detection preferably uses a meeting point or extrapolation point in one or more of the image frames between the object and a shadow of the object. The detection is preferably performed by image differencing between one of the image frames without illuminating the immediate vicinity and another one of the image frames while illuminating the immediate vicinity by the at least one light.

According to another aspect of the present invention a method is provided using a system mounted in a vehicle. The system includes a camera and a processor attached to the camera. Multiple image frames are captured from the immediate vicinity of the vehicle in a direction of motion of the vehicle. The immediate vicinity of the vehicle including the ground at least one meter from the end of the vehicle in the direction of the motion is in a field of view of the camera. The image frames are processed and thereby the object is detected which if present in the immediate vicinity behind the vehicle would have obstructed the motion of the vehicle. A warning mechanism attached to the processor preferably warns the driver of the vehicle when the object is detected. The detection is typically performed for multiple classes of obstructing objects using a single image frame while the vehicle is stationary. The classes of obstructing objects include spherical balls, vertical poles, hanging chains and upright boxes. Alternatively or in addition, the detection uses color in a single image frame when the color is distinguishable from background colors in the vicinity of the vehicle. The detection is preferably performed by performing image differencing between the image frames while the vehicle is stationary and while the object is moving. Typically, a light is attached to the vehicle which illuminates the immediate vicinity and the detection is performed using the image frames by imaging the illumination from the light. When the object is a wall in the immediate vicinity of the vehicle, a light is attached to the vehicle, illuminating the wall. The detection includes estimating a distance between the vehicle and the wall based on the position in image space of the illumination from the light. Alternatively or in addition, the detection preferably uses a meeting point or extrapolation point in one or more of the image frames between the object and a shadow of the object.

Alternatively or in addition, a first image frame is preferably captured without illuminating the immediate vicinity by the light; and whiling illuminating the immediate vicinity by the light a second image frame is captured. The processing is performed by image differencing between the first image frame and the second image frame.

According to yet another aspect of the present invention a method is provided using a system mounted in a vehicle. The system includes a rear-viewing camera and a processor attached to the rear-viewing camera. When the driver shifts the vehicle into reverse gear, or when the driver releases the brakes prior to motion in reverse and while the vehicle is still stationary or moving slowly, image frames from the immediate vicinity behind the vehicle are captured. The immediate vicinity behind the vehicle is in a field of view of the rear-viewing camera. The image frames are processed and thereby the object is detected which if present in the immediate vicinity behind the vehicle would obstruct the motion of the vehicle. The processing is preferably performed in parallel and optionally simultaneously for a plurality of classes of obstructing objects using a single image frame of the image frames. When the driver shifts the vehicle into reverse gear, the reverse lights of the vehicle are turned on. Image differencing is preferably performed between image frames captured before and after the reverse lights are turned on. Similarly, image differencing may be performed before and after the rear brakes lights are turned off when the driver releases the brakes before initiating the reverse motion of the vehicle.

The foregoing and/or other aspects will become apparent from the following detailed description when considered in conjunction with the accompanying drawing figures.

BRIEF DESCRIPTION OF THE DRAWINGS

The invention is herein described, by way of example only, with reference to the accompanying drawings, wherein:

FIG. 5A, 5B illustrate two images of an outdoor scene, with and without rear-light illumination, according to an aspect of the present invention;

FIG. 5C illustrates an image difference between the images of FIG. 5A and FIG. 5B;

FIG. 5D illustrates thresholding and difference imaging between the images of FIG. 5A and FIG. 5B;

DETAILED DESCRIPTION

Figure 1:
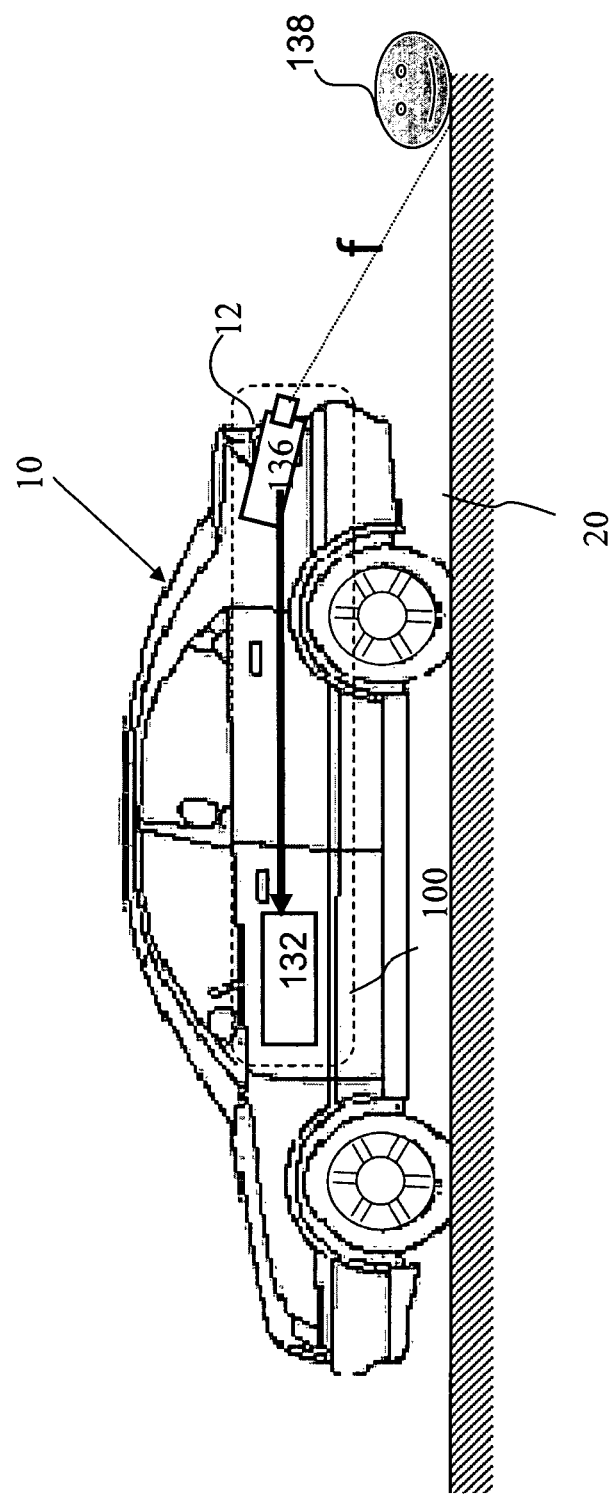
FIG. 1 illustrates a simplified exemplary diagram of a system, according to an embodiment of the present invention.

Reference will now be made in detail to embodiments of the present invention, examples of which are illustrated in the accompanying drawings, wherein like reference numerals refer to the like elements throughout. The embodiments are described below to explain the present invention by referring to the figures.

Before explaining embodiments of the invention in detail, it is to be understood that the invention is not limited in its application to the details of design and the arrangement of the components set forth in the following description or illustrated in the drawings. The invention is capable of other embodiments or of being practiced or carried out in various ways. Also, it is to be understood that the phraseology and terminology employed herein is for the purpose of description and should not be regarded as limiting.

While the discussion herein is directed toward application of the present invention to a rear viewing system mounted on a vehicle, e.g. automobile, in order to provide warnings to the driver while the vehicle is moving in reverse, the present invention may, by non-limiting example, alternatively be configured as well using side motion or front motion for special vehicles, e.g. trucks, cranes, forklifts, tanks, robots, other than typical automobiles.

Referring now to the drawings, FIG. 1 shows a simplified diagram of a system 10, according to an embodiment of the present invention. A rear-view system 100 installed in vehicle 10, having a camera 136 and a processor 132, is situated above ground plane 20.

System 100 detects and preferably classifies objects situated, in the immediate up to two to three meters behind vehicle 10. System 100 includes one or more lights 12, which in different aspects of the present invention may be one or more of taillights, brake lights, reversing lights and turn indicators.

Each object 138 detected at the rear of vehicle 10, is assumed to be disposed on ground plane 20. Hence, a distance Z to each detected object 138 is measured from the bottom of detected object 138 to camera 136. Distance Z from vehicle 10 to detected object 138 is approximately measured by processor 132 using the following equation:

$$Z = -f\frac{H}{y} \quad (1)$$

wherein H is the physical height of camera 136 with respect to ground plane 20 and y is the vertical displacement in image space of the bottom of the detected object. Aspects of measuring distance to a detected object, using a camera mounted on a vehicle, are disclosed by Stein et al. in US patent publication No. 20070154068 the disclosure of which is incorporated by reference as if fully set forth herein.

Camera 132 is preferably configured to have a wide field of view, e.g. 130-180 deg along at least one axis. The wide field of view is preferably oriented, e.g. horizontally to capture images from behind the entire width of vehicle 10. The wide field of view in at least one axis may be achieved using an rectangular image sensor, an anamorphic optical design and/or using a cylindrical lens design as is known in the art of optical design. Standard wide angle lenses are achieved using fish eye lenses or aspheric designs.

Camera 132 is typically mounted less than one meter above ground plane 20, preferably just above or below the license plate of vehicle 10 and tilted downward in order to focus on ground plane 20. The minimum depth of field of camera 132 is preferably short at about 50 centimeters. Typically, one or more camera parameters e.g aperture, exposure time are adjusted according to lighting conditions, especially between daytime and nighttime. The camera preferably includes an adjustable focus which may be used to focus on obstacles (optionally) in real time at 1-2 meters range.

A commercial camera lens suitable for camera 132 is Sunex Model DSL215 (Sunex Inc., Carlsbad, Calif., USA) featuring a 185° field of view with a relative aperture of F/2.0 and an integrated infrared (IR) cut-off filter. A suitable CMOS image sensor is Firefly® MV available from Pointgrey Research, Vancouver, Canada.

Although in FIG. 1, object 138 is shown as a ball, object 138 using different features of the present invention may be in other classes of objects including balls, toys, walls, vertical poles, chains, ropes and persons especially small children which may be found as obstacles behind vehicle 10.

Figure 1A:
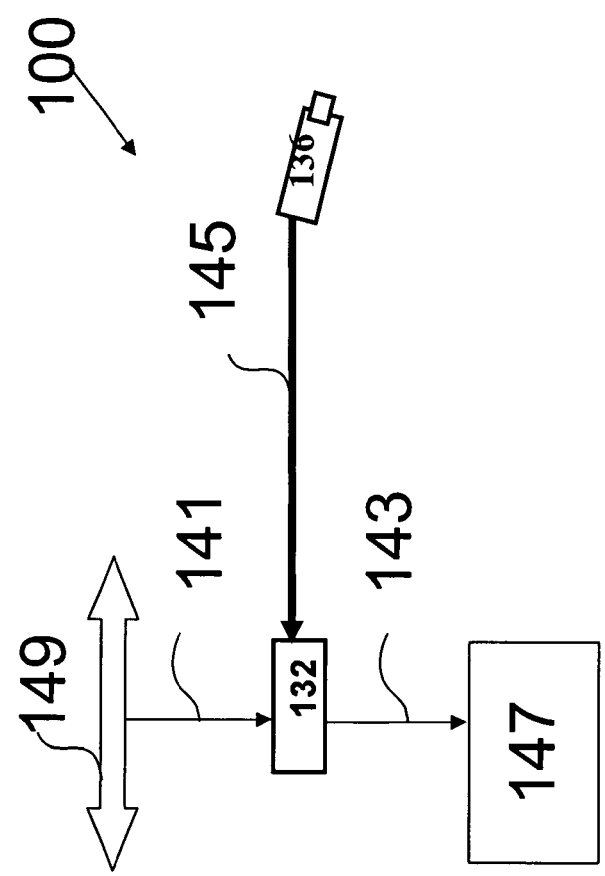
FIG. 1A illustrates schematically inputs and outputs of the system of FIG. 1, according to an aspect of the present invention.

Reference is now made to FIG. 1A which illustrates schematically inputs and outputs of rear-view system 100, according to different embodiments of the present invention. Inputs to system 100 include a video input 145 from rear view camera 136. Other input signals 141 preferably include one or more signals such as speed, steering, brake pedal activation, brake light activation, gear position, and rear light activation. Input signals 141 are typically available to system 100 from the CAN bus 149 of vehicle 10. Controller Area Network (CAN) is a computer network protocol and bus standard designed for automotive applications which allows microcontrollers and other devices to communicate with each other and without a host computer. Outputs 143 of system 100 are objects 138 or potential obstructions either in image space and/or in three dimensional physical space behind the car. Outputs 143 are preferably provided by specifying range Z and angle. Outputs 143 are preferably used to highlight information on a video monitor 147, give audible or other visible warnings, e.g. on monitor 147, to the driver and/or activate safety systems such as brakes of vehicle 10.

At the core of system 100 is image processing module 132 which incorporates a variety of vision algorithms each suitable for a different class of object, e.g. a general object of undefined shape, pole, pedestrian, ball. The algorithms used typically vary based on the state of vehicle 10, e.g stationary or moving. According to a feature of the present invention, algorithms are initiated for obstruction detection just before vehicle 10 starts to move backwards since once vehicle 10 is in motion there is less time to warn the driver regarding the obstruction. When vehicle 10 is stationary, image differencing between frames can be used to indicate a potential obstruction and provide a warning to the driver. The image differencing preferably utilizes the change in illumination in the vicinity of the vehicle when the brake lights are turned off just prior to moving the vehicle, and/or the reverse lights being turned on when the vehicle is shifted into reverse gear. According to different aspects of the present invention, obstruction detection includes detection of pedestrians particularly small children, balls, detection using color, detection using extended vertical lines, detection of vertical poles, detection of hanging chains, and detection of upright rectangles or boxes.

Pedestrian Detection

Pedestrian detection and classification is described in detail in the following reference for vehicle 10 being either moving or stationary in US patent application 20070230792, and in A. Shashua, Y. Gdalyahu and G. Hayon, "Pedestrian Detection for Driving Assistance Systems: Singleframe Classification and System Level Performance", in Proc. of the IEEE Intelligent Vehicles Symposium (IV2004), June 2004, Parma, Italy.

Detection from a Stationary Vehicle Using a Single Frame
Detection of Balls:

Spherical objects are a particularly important class of objects as they are often children's toys. If a ball is present behind vehicle 10, a child might be close by and might decide to try and save their 'prized' possession. Thus, a feature of the present invention includes detecting spherical objects 138. Spheres 138 are preferably detected by searching for circles in the image using a Hough transform on the image after edge detection has been performed within the image. Known algorithms for edge detection as developed for instance by John F Canny include the following steps: noise reduction, intensity gradient of the image, non-maximum suppression of the intensity gradient, tracing edges through the image with hysteresis thresholding and/or differential edge detection. Any circle found in an image frame is assumed to represent a ball lying on the ground. The distance to the ball (object 138) is given by applying equation (1) based on the ground plane 20 constraint. The bottom of the circle in the image is assumed to be a point on ground plane 20. According to a feature of the present invention a warning is sounded whenever a driver shifts to reverse and a sphere is detected within a certain range Z. Balls which are located above the ground will give a range too large but these are less critical as they are more likely to be balls on the shelf or sidewalk and thus not signifying the same danger. A circle detection which is below ground plane 20 may also result in a warning to the driver but a hole is also a sufficient obstruction worth providing a warning. Since most planar circles in the three dimensional world are either lying flat on the ground, e.g. manhole cover, or on vertical planes (e.g. traffic signs, drawings on walls etc), these circles typically appear as ellipses in the image and thus will not cause many false warnings. A traffic sign right behind the vehicle would appear as a circle. A traffic sign recognition algorithm is optionally performed and once a traffic sign is confirmed the two parallel lines protruding below the circular sign are taken to be the pole.

Detection Using Color

Particular colors (such as red, orange and blue) are typical for obstacles and not for clear road surfaces. By searching in the HSV (hue,saturation,value) color space, image regions are detected with these hues above a threshold value of saturation. These colored image regions can be used as inputs for obstruction detection algorithms, according to other features of the present invention. For example, the bottom edge of a colored ball in the image can be used to estimate the distance to the colored ball using the ground constraint equation (1). A warning can be given when a colored ball is close and in path of the rearward moving vehicle 10 if the driver shifts into reverse.

Detection of Obstacles Using Extended Lines

A vertical line is an image that extends across the horizon line in an image of an object of interest, i.e. a potential obstruction 138 since the object is clearly not a lane or road marking when object 138 extends above road plane 20 and is not at infinite distance. The bottom point in the vertical line in the image (on ground plane 20) gives an upper bound to the range between vehicle 10 and object 138 and can be used for directly warning the driver. Vertical image lines when detected can be used to trigger attention to other detection modules, according to other features of the present invention for instance the detection of vertical poles.

Detection of Vertical Poles

Pairs of substantially vertical extended lines detected close together in an image indicate that object 138 is a vertical pole. If the pole is directly inserted into the ground the ground plane constraint, equation (1), gives an accurate estimate of the range Z. If the pole is on a raised base then the distance estimate is too large. It is therefore useful to correctly detect the base of the pole. According to a feature of the present invention, we look for circular and/or square bases. A circular base appears in the image as an ellipse. However, not all ellipses are valid since the circle (cross section of the cylindrical base) is in a plane parallel to ground plane 20 and is centered around the pole. Since the difference due to the ellipse height above ground plane 20 is small we can search in image space for ellipses which are images of circles on the ground plane and parameterized by distance and radius. The 3rd degree of freedom of circles on the ground plane is constrained since the circle center must lie on a line equidistant from the two lines defining the pole.

Detection of Hanging Chains

It is often the case that parking spaces are closed by chains hanging between two posts. According to a feature of the present invention, the driver is warned before backing up into such a chain. It is well known that a hanging chain forms a catenary curve, defined by the following equations:

$$y = \alpha \left( \cosh\left(\frac{x}{\alpha}\right) - 1 \right), \quad (2)$$

wherein $$\alpha = \frac{T_0}{\lambda}, \quad (3)$$

Figure 2:
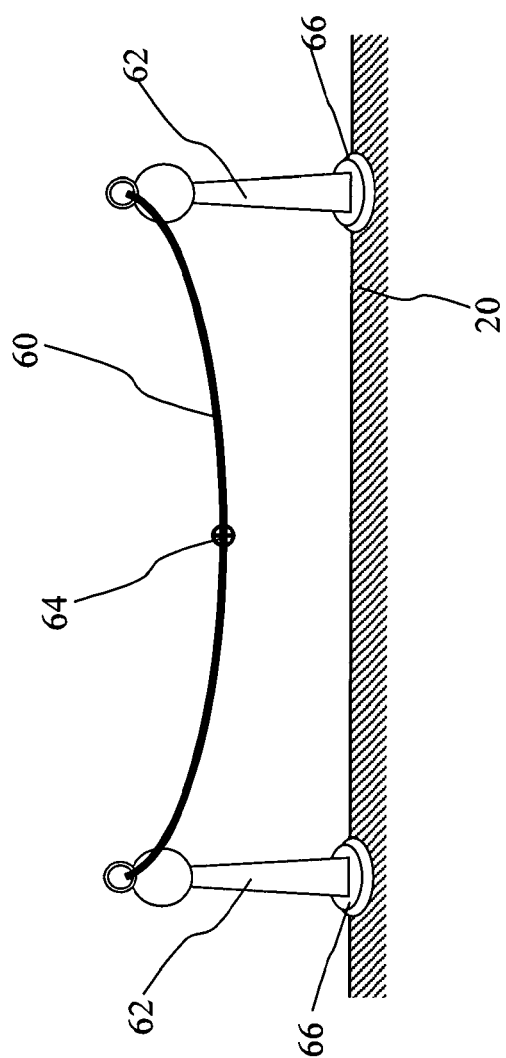
FIG. 2 illustrates a chain hanging between posts as an example of an object in a class of obstructions, detectable according to features of the present invention.

Reference is now made to FIG. 2, which illustrates a chain 60 hanging between posts 62 in the immediate vicinity of the rear of vehicle 10. Chains 60 that lie in the plane perpendicular to the rearward direction of vehicle 10 are typically considered. Furthermore we are looking for chains 60 within a certain length range (e.g. 1 to 4 meters) and with a certain degree of sagging (e.g. 2% to 10% of the curve length). Chain 60 appears in the image as a perspective transformation of this curve. An algorithm for detecting chain 60, according to a feature of the present invention is as follows:

1. Run an edge detection algorithm on the image from camera 136 to locate long lines.
2. Select lines that are not straight, have a local minimum, e.g point 64, and curve upwards.
3. Each local minimum is a candidate minimum of a catenary curve. This leaves two degrees of freedom: (i) the distance to the minimum point (which given the known camera geometry gives the three dimensional physical coordinate of the point) and (ii) the curve parameter α (alpha) from equation (2).
4. Search the two dimensional image space for the best match with points on the line. The result from this stage is a curve segment that extends from the candidate minimum.
5. For each possible distance of the chain to vehicle 10 compute the three dimensional physical location of the end points of chain 60 and minimum point 64. Discard lines that do not meet the length and curvature criteria as defined above.
6. Once a best fit has been found, check to see if there are vertical lines or poles (pairs of vertical extended lines) near the ends. These are candidate posts 62 which support chain 60. The bottom of these vertical lines is assumed to be on ground plane 20 and thus gives a distance estimate to chain 60 from vehicle 10 using equation (1).

Detection of Upright Rectangles and Boxes

Rectangular surfaces which are perpendicular to ground plane 20 are of interest. In particular these could be the side of a box. To detect rectangular surfaces, we look in image space for two vertical lines joined at the top and bottom by two straight lines. Due to perspective, these top and bottom lines need not be parallel. The bottom line is assumed to lie on ground plane 20 and thus gives a distance to the two vertical lines. This in turn gives the three dimensional physical coordinates of the upper line. In particular we can check if the upper line appears to be parallel to ground plane 20.

If the upper line appears to be parallel to the ground plane then the image region is a candidate upright rectangle. To be considered an obstruction, rectangles that are in the vehicle path are kept which are within a certain distance and not too large. For example, the object must be lower than a certain minimal height, e.g. 1 meter, and at least one of the upright lines must be within the vehicle path. Anything larger than the minimal height is typically noticed by the driver. An extra check can be performed such as checking for possible transparency. Rectangles are typically rejected in which at least one of the lines is cut by another line in the image.

Detection from a Stationary Vehicle Using Multiple Frames and Object Motion

When vehicle 10 is stationary, image differencing can be used between image frames to detect moving objects. In particular, image differencing between frames is used for detecting obstructions 138, e.g balls, people and other vehicles which suddenly enter the field of view of camera 136. An algorithm for detection based on image differencing, according to aspects of the present invention is as follows:

1. First, simple image differencing between multiple image frames is performed to produce a difference image. The intensity (and/or color) of corresponding picture elements (pixels) of two image frames from camera 136 are compared. The difference image is derived from the comparison, typically the pixel-by-pixel intensity/color difference between the two image frames.

2. The difference image is thresholded and portions of the difference image with intensity greater than a threshold are preferably connected to form connected components patches.

3. For each connected component patch, the optical flow is preferably computed. We are looking for a more or less uniform optical flow direction over the patch. Optical flow is the pattern of apparent motion of objects, surfaces, and edges in a visual scene caused by the relative motion between an observer (an eye or a camera) and the scene.

4. If the dominant optical flow component is measured over three or more frames to see if it is consistent. These last two steps help remove false alerts due to moving shadows from overhead trees.

5. The bottom of the connected component is assumed to be on ground plane 20 and this gives a distance estimate using equation (1).

6. The object detected is tracked over time, i.e. multiple image frames. If the object then stops moving, the final position is stored in storage attached to processor 132.

7. A warning is preferably given if the driver shifts into reverse gear and an object was detected based on the image difference in the path of vehicle 10 within a certain range Z.

Detection from a Stationary Vehicle Using Multiple Frames and Rear Lights

Referring back to FIG. 1, vehicle 10 typically has four types of lights 12 at the back: taillights, brake lights, reversing lights and turn indicators. When a driver intends to drive vehicle 10 in reverse, the driver typically presses on the brakes thus turning on the brake lights, and then the driver shifts into reverse thus turning on the reverse lights. The location of lights 12 relative to the camera is known and the exact timing of switching on of lights 12 can be provided to system 100 (e.g. from the CAN bus). According to features of the present invention, change analysis, e.g. color/intensity image differencing is performed between two image frames from camera 136, using one image frame just before the exact moment lights 12 go on (either the white reverse lights and/or the red brake lights) and another image frame just after lights 12 go on. Using the image differencing, changes in the physical scene as viewed by camera 136 due to turning on vehicle lights 12 can be determined. This image information can be used in multiple ways, according to different aspects of the present invention and can provide important information about the physical three dimensional area behind vehicle 10 and the presence of obstacles 138.

In order to deal with the lights 12 being switched on exactly when parameters (e.g. gain, exposure) of camera 132 are changed a procedure may be followed according to a feature of the present invention. Assume camera 132 is going from setting 1 to setting 2 due to changes in lighting, for instance, the sun appears from behind a cloud. First camera 132 is switched from a first setting to a second setting, and then switched back to the first setting for at least one frame. Afterward the at least one frame, the second setting is restored. In this way any event of switching on lights 12, the switching is straddled by two frames with the first setting or two frames with the second setting or both.

Estimating the Distance to a Wall

Figure 3A:
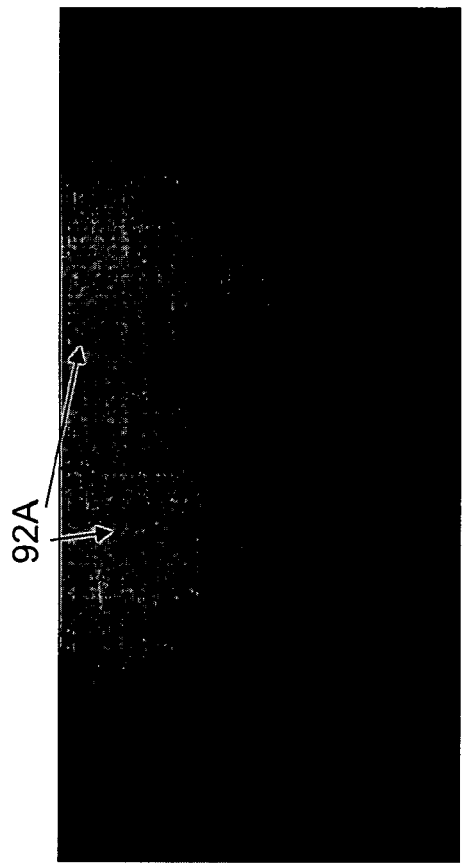
FIG. 3A and FIG. 3B illustrate aspects of the present invention, showing images captured from a rear viewing camera after the vehicle is shifted into reverse gear.
Figure 3B:
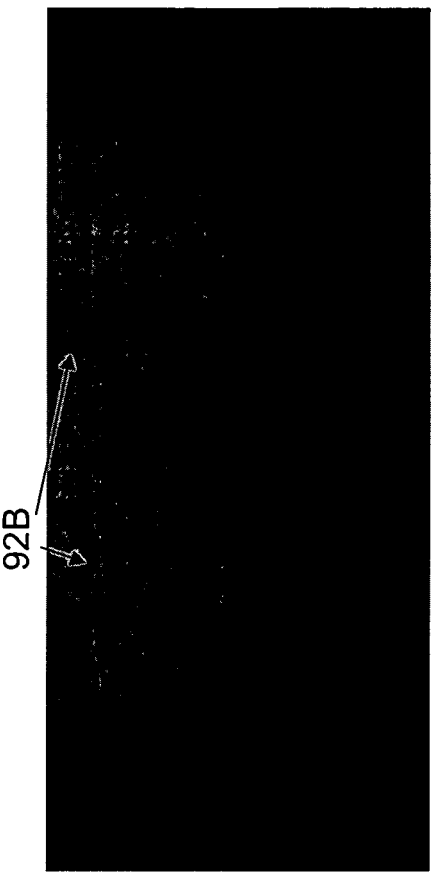

Reference is now made to FIGS. 3A and 3B, which illustrate aspects of the present invention, showing images from camera 136 after vehicle 10 is shifted into reverse gear. In FIG. 3B vehicle 10 is closer to the back wall than in FIG. 3A. Bright patches 92A, 92B of light on the back wall are from reverse lights 12. When vehicle 10 is closer to the wall in FIG. 3B, each of reverse lights 12 appears farther from the center of the image.

The geometry of lights 12 relative to camera 136 is fixed. So, for example, in the two images shown in FIGS. 3A and 3B the relative location of the two bright patches 92 on the wall gives the distance to the wall, according to an aspect of the present invention.

The following algorithm, according to a feature of the present invention, for determining distance to a wall, assumes typical rear lights 12 which are aimed directly rearwards. Fights 12 in this example have no special illumination characteristics and are assumed to illuminate with a cone of light which is brightest in the center of the cone. These cones of light appear as bright spots 92 on the wall behind vehicle 10.

1. Detect switch on rear lights from the CAN bus or perform direct analog to digital conversion of the voltage to the lights.
2. Subtract image from before lights were turned on from the image after the lights were turned on.
3. Detect centers (or centroids) of one or both bright patches corresponding to one or both rear lights.
4. Compute distance to wall based on the following equation:

$$Z = f \frac{X}{x} \qquad (4)$$

where f is the camera focal length, X is the lateral position of the rear light relative to the camera and x, the position of the peak brightness of the spot. The location of the centers/centroids of spots 92 does not necessarily need to be accurately determined since the distance X is large (0.6 m to 0.9 m) and the relevant distance to the wall is short (1-2 meters). With such parameters an error in center position of 10 pixels gives a wall distance error on the order of 20 cm. which is acceptable for most applications Fine tuning of the distance can be performed by searching the bottom of the image for horizontal lines which are within the error bounds, s, of the distance found using reverse lights 12 assuming they lie on the ground plane.

$$\left| f \frac{H}{y} - Z \right| < \varepsilon \qquad (5)$$

where H is the camera height, y is the vertical position of the line in the image, and Z is the distance computed using reverse light spots 92.

It is possible to improve the algorithm if the lighting pattern 92 from reverse lights 12 has a more complex illumination pattern for instance with strong edges or center. This is often the case in practice and furthermore the reverse lights internal mirror surfaces and external plastic lens case may be designed as is known in the art of optical design to illuminate with a more complex illumination pattern. For example, if the reverse light produces a somewhat vertical streak of light it is possible to more accurately estimate distance along the vertical streak.

Figure 7:
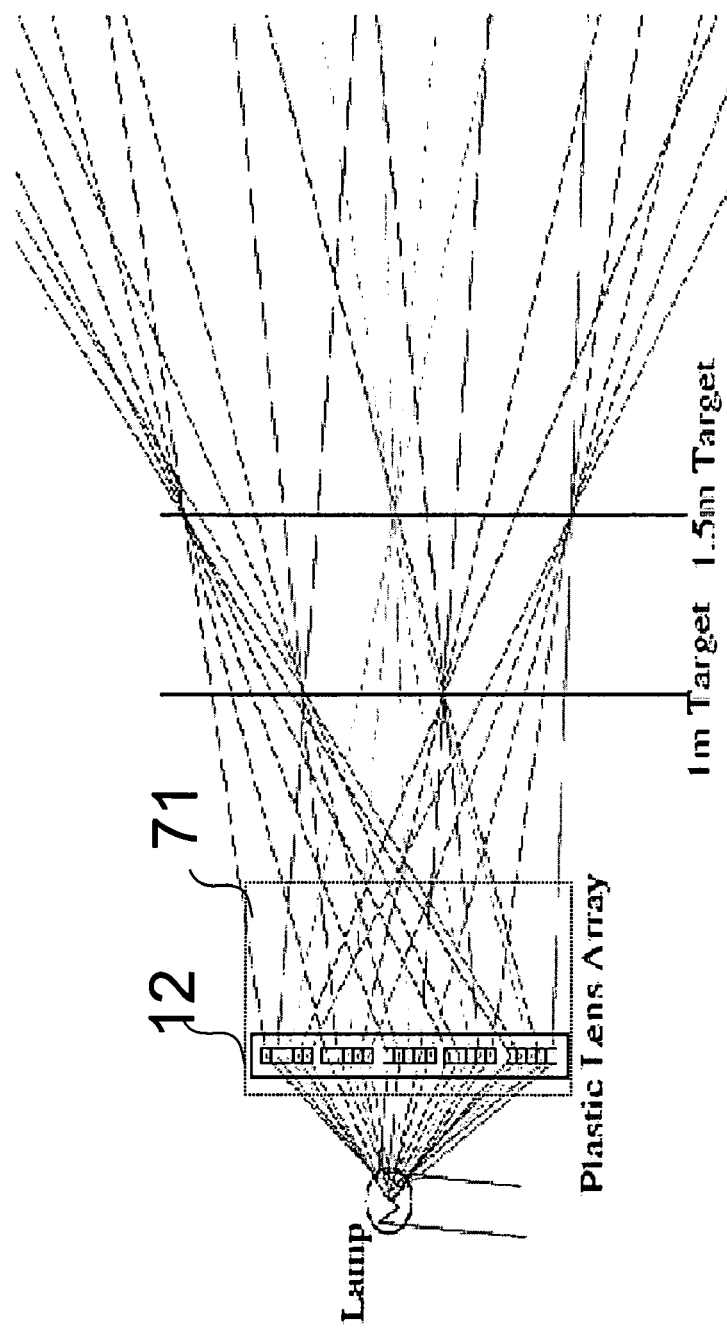
FIG. 7 illustrates a reverse light integrated with a lens array, according to a feature of the present invention.

Equation (4) is relevant for light beams parallel to the optical axis of vehicle 10 which is the typical case for light-emitting units such as rear lights which are configured to shine straight back. However, if the beams are not parallel, the angle of the beams is known a priori or by calibration, the distance to the wall can be calculated using standard methods of "stereo vision", as is known in the industry. The intersection of a light beam and the line of sight of the camera pixel provides the three dimensional physical location of the intersection of the light beam and the obstacle. Reference is now made to FIG. 7 which illustrates a desired specification of light source, e.g. reverse light 12 designed with a lens array 71 integrated into the cover of lamp 12, according to a feature of the present invention. Lens array 71 preferably focuses on spots at distances between one and two meters while providing uniform illumination of longer distances. The advantage of lens array 71 is that they concentrate the light at or near the focal distance of camera 132 so that it is easier to image the focal spots of light 12 during daylight hours.

Obstacle Detection Using Shadows on the Ground Plane

The images of FIG. 3A, 3B show an example of shadows created by reverse lights 12 (or brake lights) due to physical obstacles, e.g. cinder blocks 80L and 80R shown on the floor of the images of FIGS. 3A and 3B.

Figure 4:
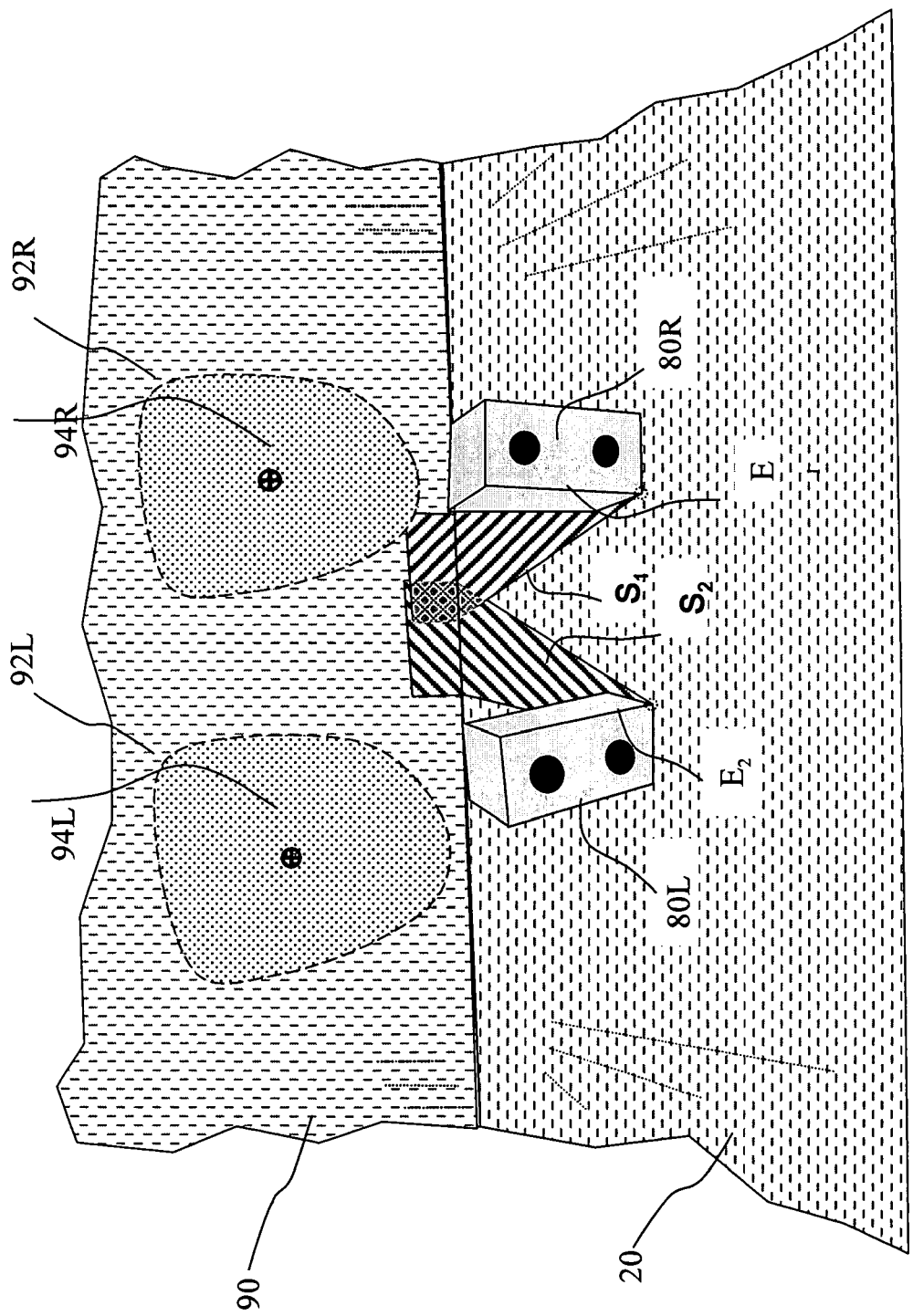
FIG. 4 is a graphical representation showing features of the image of FIG. 3A.

Reference is now also made to FIG. 4 which is a graphical representation of the image of FIG. 3A. Ground plane 20 and rear wall 90 are shown. Bright spots 92L and 92R from lights 12 are shown. Centroid positions 94L and 94R within bright spots 92L and 92R are shown respectively. Since the relative position of the light source, e.g. reverse light 12 and camera 136 is precisely known and the location and angular orientation of camera 136 relative to ground plane 20 is also known, possible matches may be found between imaged edges Ei of objects, e.g. cinder blocks 80L and 80R in the image and shadow edges Sj in the image. Once matches are found these can be used to determine the three dimensional position of objects, e.g. cinder blocks 80L and 80R.

An exemplary algorithm follows for detecting vertical obstacles, e.g. cinder blocks 80L and 80R, according to an aspect of the present invention:

1. Detect preferably all straight vertical lines in the image. Vertical straight lines in the image are potentially from edges Ei of three dimensional physical obstacles e.g. cinder blocks 80L and 80R.
2. Detect preferably all straight edges in the image which appear after lights 12 are switched on. These are potentially edges Sj of shadows of obstacles.
3. Test preferably each pair (Ei. Sj) to see if it is possible to match with tests as follows:
   (a) Pick lines that meet at a point or that their extensions meet at a point; lines that cross are typically rejected.
   (b) The angle between lines (Ei, Sj) must be less that 90 degrees.
   (c) The point of meeting must be at the bottom of the vertical line (or its extension).
4. Test pairs (Ei, Sj) that passed the tests (a), (b), (c) above using the precise geometry of the camera and light source.
   (a) Assume the meeting point in the image of the vertical line and the shadow line (x, y), is on the ground plane. Compute the location of the point in three dimensional world coordinates:

$$Z = f\frac{H}{y} \quad (6)$$

$$X = f\frac{Z}{x} \quad (7)$$

where Z is the longitudinal distance from the camera and X the lateral distance.

(b) Project the expected shadow location Se of the vertical line given the location of light source 12 and the location of camera 136.
(c) Compute maximum image distance between points on the candidate shadow line Sj and the computed one Se. If this distance is below a threshold then the match is preferably accepted.

Although the above algorithm assumes the vertical lines are from sharp edges, a similar algorithm may be applied to vertical cylinders. It is also possible to try to match curved lines in the image that come from upright objects in the world (such as pedestrians or poles) to curved lines that belong to their corresponding shadows. For a curved line S we can hypothesize that lines S comes from such an upright object and then 'guess' a distance. For each point along the curve S one can compute the expected location of the shadow given that distance. One can then see if curve S aligns with an edge point in the illuminated image (which might be a candidate shadow edge point). For each 'guessed' distance one can count the number of points that match a possible shadow edge point and pick the distance that matches the largest number of points. If certain percentage of matched points is above a threshold a matched curve at that distance is detected.

Detection of General Obstacles Using Brightness Changes

In bright outdoor scenes it might not be possible to see actual shadows on the ground due to rear lights. However, since the angle of illumination from rear-lights 12 is very different than from the overhead sun, some change in illumination may be detected on objects in the scene. Reference is now made to FIG. 5. FIGS. 5A and 5B illustrate two images of an outdoor scene, with and without rear-light illumination. When image differencing is applied (FIG. 5C bottom left) and thresholding difference imaging (FIG. 5D bottom right) a brightness change is clearly seen on the close upright object which in this case is a pedestrian located about one meter behind vehicle 10. The solid horizontal line in FIG. 5B highlights a line in the image that projects to points on the ground approximately 2.5 m behind the camera. Given that there is considerable ambient lighting during daylight, a noticeable change in illumination on points at that distance and on surfaces parallel to the ground is not expected. The fact that a change in illumination is detected indicates we have an object quite a bit closer.

Figure 6:
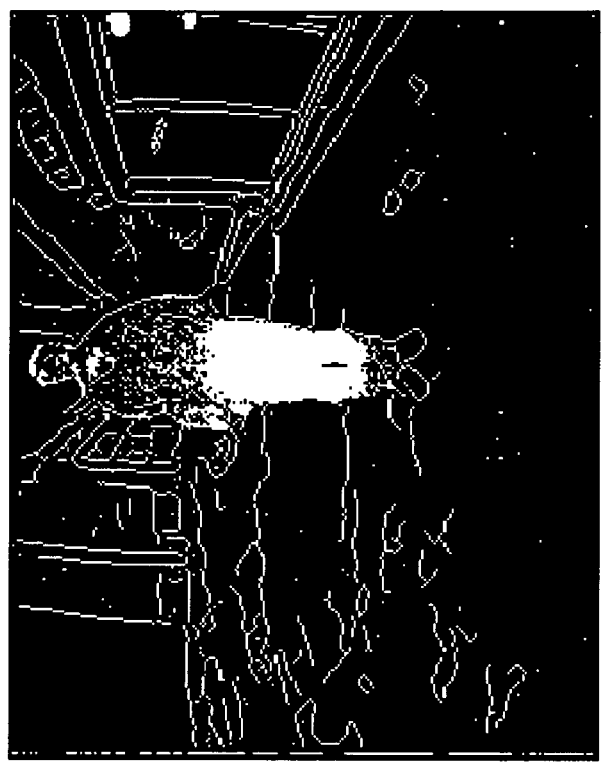
FIG. 6 illustrates an image after processing with a combination of image differencing and Canny edge detection, according to an embodiment of the present invention.

The bottom of the bright blob in difference images (FIGS. 5C,5D) gives an estimate of the distance to the pedestrian. In this case the result was 1.3 m. Fine tuning of the distance estimates can be done by combination with edge images. Reference is now made to FIG. 6 which illustrates an image from system 100 after processing with a combination of image differencing and Canny edge detection, according to an aspect of the present invention. With edge detection, the extent of the visible blob may be extended downward toward ground plane 20, estimated by a point with no detectable edges. The distance to the pedestrian may then be estimated using the ground constraint equation (1). A warning can be given to the driver if a suspected object is detected close behind the vehicle so that the drive. In embodiments of the present invention in which a monitor is connected to system 100, the bright blob which is suspected to be an obstacle is preferably highlighted.

While the invention has been described with respect to a limited number of embodiments, it will be appreciated that many variations, modifications and other applications of the invention may be made.

The invention claimed is:

1. An obstacle detection method for a system mountable in a vehicle, the system including a camera and a processor, the method comprising:
   capturing an image frame from a vicinity of the vehicle;
   detecting imaged object edges of an object in the image frame;
   illuminating the object positioned in a moving direction of the vehicle using a vehicle light;
   detecting one or more shadow edges of a shadow of the object responsive to the illumination from the vehicle light and one or more object edges of the object;
   generating a subset of pairs of the one or more imaged shadow edges and the one or more object edges, wherein each pair in the subset of pairs comprises a shadow edge and an object edge where:
      at least one of the shadow edge and the object edge or a first extension of the shadow edge and a second extension of the object edge meet at a point;
      an angle between the shadow edge and the object edge is less than 90 degrees; and
   for each pair in the subset:
      determining a location of the meeting point in three-dimensional space;
      projecting an expected shadow edge based on the object edge; and
      determining a distance between at least one point on the expected shadow edge and at least one point on the shadow edge; and
   determining the object is at a three-dimensional location based on a comparison of the distance to a predetermined threshold.

2. The obstacle detection method of claim 1, wherein the point is at a terminus of at least one of the shadow or the object edge.

3. The obstacle detection method of claim 1, wherein the object edge in each of the subset of pairs is a vertical line.

4. The obstacle detection method of claim 3, wherein the meeting point is at a bottom terminus of the object edge.

5. The obstacle detection method of claim 4, wherein the bottom terminus of the object edge is at a ground plane.

6. The obstacle detection method of claim 1, wherein at least one of the object edge or the shadow edge is a curved line.

7. The obstacle detection method of claim 1, wherein determining the location of the meeting point is based on one or more image space coordinates of the meeting point responsive to a geometry of the camera and the vehicle light providing the illumination and a focal length of the camera.

8. The obstacle detection method according to claim 1, wherein the vehicle light is illuminated in response to the vehicle shifting into a reverse gear.

9. A system mountable in a vehicle for obstacle detection, the system including a camera and a processor attached to the camera, the processor configured to:
   capture an image frame from a vicinity of the vehicle;
   detect imaged object edges of an object in the image frame;
   illuminate the object positioned in a moving direction of the vehicle using a vehicle light;
   detect one or more shadow edges of a shadow of the object responsive to the illumination from the vehicle light and one or more object edges of the object;
   generate a subset of pairs of the one or more imaged shadow edges and the one or more object edges, wherein each pair in the subset of pairs comprises a shadow edge and an object edge where:
      at least one of the shadow edge and the object edge or a first extension of the shadow edge and a second extension of the object edge meet at a point;
      an angle between the shadow edge and the object edge is less than 90 degrees; and
   for each pair in the subset:
      determine a location of the meeting point in three-dimensional space;
      project an expected shadow edge based on the object edge; and
      determine a distance between at least one point on the expected shadow edge and at least one point on the shadow edge; and
   determine the object is at a three-dimensional location based on a comparison of the distance to a predetermined threshold.

10. The system according to claim 9, wherein the point is at a terminus of at least one of the shadow edge or the object edge.

11. The system according to claim 9, wherein the location of the meeting point is determined based on one or more image space coordinates of the meeting point responsive to a geometry of the camera and the vehicle light providing the illumination and a focal length of the camera.

* * * * *